United States Patent [19]

Mehren

[11] 4,249,780
[45] Feb. 10, 1981

[54] PRESSURE MEDIUM BRAKE SYSTEM FOR A VEHICLE

[75] Inventor: Herbert Mehren, Ludwigsburg, Fed. Rep. of Germany

[73] Assignee: Daimler-Benz Aktiengesellschaft, Fed. Rep. of Germany

[21] Appl. No.: 774,541

[22] Filed: Mar. 4, 1977

[30] Foreign Application Priority Data

Mar. 18, 1976 [DE] Fed. Rep. of Germany ....... 2611355

[51] Int. Cl.³ .............................................. B60T 8/00
[52] U.S. Cl. .................................................. 303/115
[58] Field of Search ................... 303/15, 115, 117, 119

[56] References Cited

U.S. PATENT DOCUMENTS 3,653,729  4/1972  Newell et al. ...................... 303/15 X
3,854,501  12/1974  Machek ................................ 303/119

Primary Examiner—Duane A. Reger
Attorney, Agent, or Firm—Craig & Antonelli

[57] ABSTRACT

A pressure medium brake system for vehicles with an electromagnetic control valve for forming a brake control pressure that increases with an increase of the energization of the coil of the electromagnetic control valve. The control valve produces a pilot control pressure which decreases with an increase of an energizing current while a modulating converter, which supplies an adjusting force that is dependent on the difference between the pilot control pressure and an essentially constant comparison pressure and that increases with an increase of the energizing current, adjusts by means of its adjusting member the brake control pressure.

44 Claims, 3 Drawing Figures

PRESSURE MEDIUM BRAKE SYSTEM FOR A VEHICLE

The present invention relates to a pressure medium-brake installation for vehicles, with an electromagnetic control valve for the formation of a brake-control pressure increasing with an increase of the energizing current.

In a known brake system of the aforementioned type such as, for example, described in German Offenlegungsschrift No. 2,406,690, a control valve directly supplies a control pressure so as to cause a rise in the brake control pressure with an increase of the energizing current so that with a large pressure drop, large adjusting forces are necessary, which presuppose large magnets and high control currents.

The aim underlying the present invention essentially resides above all in creating a brake installation of the aforementioned type which can be operated also at high pressure drops with small magnets and low control currents.

The underlying problems are solved in an advantageous manner according to the present invention in that the control valve supplies a pilot control pressure decreasing with an increase of the energizing current and in that a modulation converter supplies an adjusting force, which force is dependent on the difference between the pilot control pressure and an essentially constant comparison pressure and which force increases with an increase of the energizing magnitude or energizing current so as to adjust the brake control pressure by means of an adjusting member.

In the brake installation according to the present invention, the control valve has essentially only a down-control function, i.e., a function of only decreasing the pilot control pressure, which function is realizable also at high-pressure drops by means of small adjusting forces.

It is particularly advantageous if the brake installation according to the present invention operates by means of a control valve, in which a pressure-medium that flows-in a throttled manner, is controllable by an excess pressure valve having a valve closure member that is movable with respect to a coordinated valve seat by means of an armature extending essentially transversely thereto in dependence upon the energization of a ring-shaped electromagnet. The armature is pivotal about an axis located outside of the magnet gap, whereby the system formed of armature and valve closure member is sealingly suspended essentially in the mass center at a diaphragm with the diaphragm sealingly separating the magnet part from the valve part. The pivot axis of the system lies in the diaphragm plane. With this valve according to the German patent application P 25 11 152.8, the possibility exists to control a pressure according to the reverse function of the desired dependency between the brake control pressure and energizing magnitude in that the armature arranged concentrically to the annular magnet extends directly adjacent the diaphragm through a ring-shaped first pole shoe, and a second pole shoe of the electromagnet which is located outside of the axis of symmetry is coordinated to the end of the armature remote from the diaphragm.

By pivoting the second pole shoe, the direction of the magnetic force can be reversed whereby the latter is able to operate in the same sense or also in the opposite sense to the closing direction of the excess pressure valve. With a magnet force operating in the opposite direction, the control valve adjusts a pressure decreasing with an increase of the energizing magnitude or energizing current.

In the known brake installation, a feedback effect is attained in that one diaphragm piston each acted upon by the brake control pressure operates on one of the two valves of the control valve for the up-and down-control of the brake control pressure, and more particularly in the sense opposite to the electromagnet appertaining to the respective valve. In the brake installation according to the present invention, only one electromagnet is necessary for the control valve. The feedback effect takes place thereby in an advantageous manner such that the adjusting member of the modulating converter operates with a conventional feedback of the brake control pressure.

In the brake system according to the present invention, the comparison pressure or the pilot control pressure or both of these pressures can be derived from a pressure source separate from the pressure source of the brake control pressure. However, it would also be possible to derive the pilot control pressure and the comparison pressure from different pressure sources. However, in an advantageous embodiment of the brake system according to the present invention, provision is made that a pressure chamber of the modulating converter is adapted to be placed under the pilot control pressure and a pressure chamber of the modulating converter is adapted to be placed under the comparison pressure with the pressure chambers being connected with each other by way of a pressure-medium filling-connection containing a throttle that automatically shuts off as a function of pressure. In this manner, the modulating converter connected with only a single pressure source requires only one filling-connection for its two pressure chambers. It is assured by the throttle of the filling-connection which shuts off automatically, that the pressure build-up in both pressure chambers can be so matched to one another that the adjusting member of the modulating converter cannot be displaced during the filling into a position triggering a brake control pressure.

In the brake installation according to the present invention, the measuring of the pressure difference between pilot control pressure and comparison pressure can be so realized in an advantageous manner by separating a pressure chamber adapted to be palced under pilot control pressure and a pressure chamber of the modulating converter adapted to be placed under comparison pressure from one another by a piston diaphragm connected with the adjusting member.

In order to be able to operate in the brake system according to the present invention with a low pressure level for the control valve and for the modulating converter and therewith also with small, lightweight aggregates for these control devices, it is advantageous that the modulating converter controls a servo or amplifier device interconnected between a brake control pressure line and a pressure source.

The return of the brake control pressure to the modulating converter for purposes of achieiving the feedback effect can take place in the brake system of the present invention in such a manner by providing a servo or amplifier device which includes a hollow slide valve member in communication, by means of a central opening, with the brake control pressure line, and with one end of the side valve member being adapted to be brought into abutment at a pressure surface cooperating with the adjusting member of the modulating converter.

Whereas in the known brake installation, two adjusting motors are required for the two valves for the up- and down-control (increase and decrease control) of the brake control pressure, it is advantageous in the brake installation according to the present invention that the amplifier or servo device includes a common adjusting member for the actuation of both an inlet valve interconnected between the pressure source and the brake control pressure line and also of an outlet valve interconnected between a pressure-relieved zero-connection and the brake control pressure line.

In the brake installation according to the present invention, separate lines for the return of the brake control pressure to the adjusting member of the modulating converter are avoided in that the outlet valve of the amplifier or servo device is provided with a movable valve closure member provided with a pressure area for the feedback effect. The hollow slide valve member or the one slide valve member end thereof thereby operates as valve seat of the outlet valve. This is made possible by virtue of the fact that the servo or amplifier includes a valve chamber operatively connected with the zero-connection, in which valve chamber a valve closure member of the outlet valve is arranged with the valve closure member being provided with a pressure surface cooperating with the one slide valve member end projecting into this valve chamber, which end is movably guided in the direction of the slide valve member axis.

An arrangement of the inlet valve of the amplifier or servo device which is advantageous with respect to the hollow slide valve member is attained in the brake installation according to the present invention in that the hollow slide valve member extends through a valve chamber of the amplifier or servo, which is in communication with a connection for the pressure source, and in that this valve chamber is closed off by the ring-shaped inlet valve with respect to a valve chamber in communication with a connection for the brake control pressure line, in which is located the other slide valve member end. This arrangement enables, in a particularly simple manner, the hollow slide valve member actuate the valve closure ring of the inlet valve.

In order not to disturb the functioning of the control valve in the brake system according to the present invention, it is appropriate if the pressure surfaces at the hollow slide valve member, influenced by the respective pressure in the valve chambers, are so matched in their size with respect to one another that no feedback pressure forces occur at the hollow slide valve member in the directions of the slide valve member axis.

The modulating converter and the servo or amplifier may be structurally combined into a single aggregate in the brake installation according to the present invention. It is then advantageous especially with such an installation to derive the brake control pressure, the pilot control pressure and the comparison pressure from a common pressure source. The arrangement may thereby be made in such a manner that the valve chamber of the amplifier or servo device, which is in communication with the connection for the pressure source, and the pressure chamber of the modulating converter, which is adapted to be placed under the pilot control pressure, are connected with each other by a pressure-medium connection containing a throttle.

In the known brake installation, the control valve modulates a brake pressure adjusted at will. If the brake valve adapted to be actuated at will is thereby in its rest position, the brake pressure and therewith also the control valve is turned off so that in this case no braking is possible.

In order to be now able to control the brake installation also independently of the driver by a computer and to be able to override nonetheless at will the brake signal produced by the computer, it is advantageous that an adjusting or servo motor operating by means of the brake control pressure and a brake pedal actuatable at will are connected by way of a differential adjusting drive with a brake valve, especially with a multicircuit brake valve.

Accordingly, it is an object of the present invention to provide a pressure-medium brake installation for vehicles which avoids by simple means the aforementioned shortcomings and drawbacks encountered in the prior art systems.

Another object of the present invention resides in a pressure-medium brake system for vehicles which can be operated with small magnets and low control currents even at high pressure drops.

A further object of the present invention resides in a pressure-medium brake installation for vehicles which is simple in construction, utilizes relativey small, lightweight devices and is highly reliable in operation.

A still further object of the present invention resides in a pressure-medium brake system for vehicles of the type described above which tulizes relatively few, simple and lightweight elements for the various control functions thereof.

Another object of the present invention resides in a pressure-medium brake system for vehicles which not only reduces the number of parts required but also simplifies the connection thereof in the system.

These and other objects, features and advantages of the present invention will become more apparent from the following description when taken in connection with the accompanying drawings in which show, for purposes of illustration only, one embodiment in accordance with the present invention, and wherein.

Figure 1:
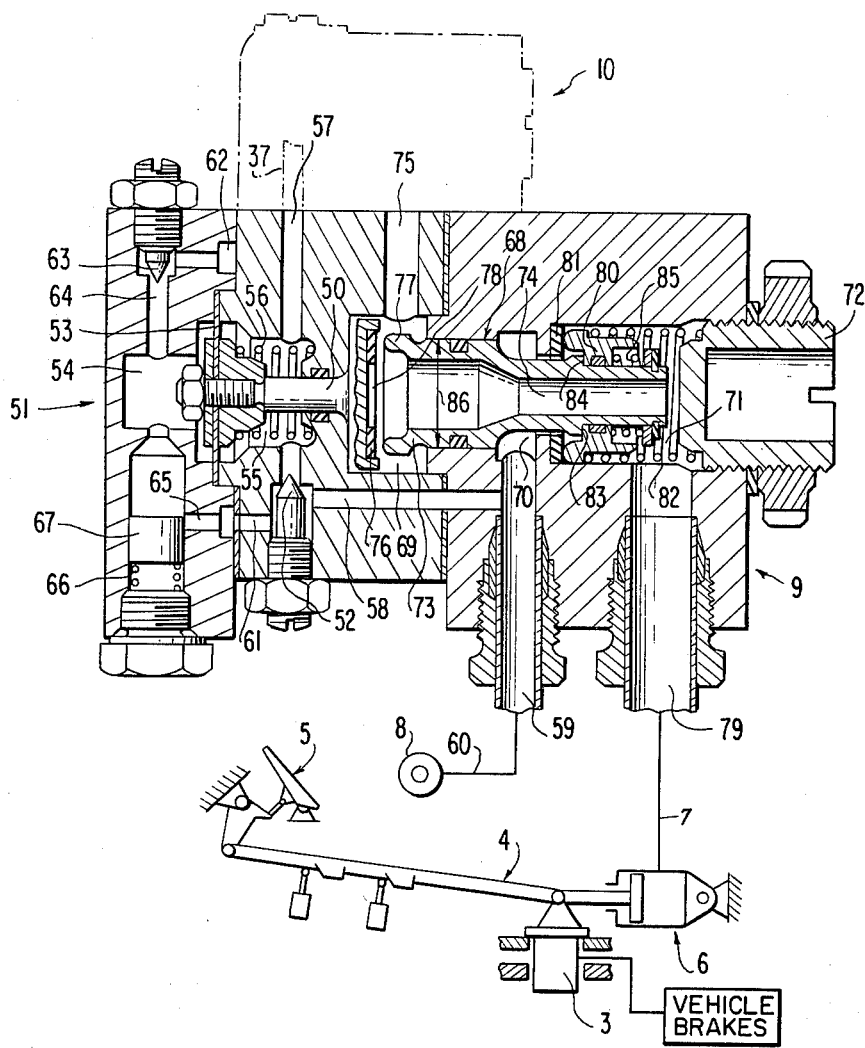
FIG. 1 is a schematic view, partly in cross section, of a brake installation in acorrdance with the present invention, in which the modulating converter and the servo-booster are shown in cross section approximately to scale.

Referring now to the drawings wherein like reference numerals are used throughout the various views to designate like parts, according to FIG. 1, the adjusting member 3 of a conventional, two-circuit motor vehicle brake relay valve, which is not illustrated in detail since it forms no part of the present invention, is actuated by way of a differential adjusting actuator generally designated by reference numeral 4 from a brake pedal 5 and from a pressure-medium adjusting motor, generally designated by reference numeral 6. The adjusting motor 6 is operated with a brake control pressure of a brake control pressure line 7 which is fed from a servo or amplifier device generally designated by reference numeral 9 which is connected to a pressure source 8. The servo or booster device 9 is controlled by an adjusting slide valve member 50 of a modulating converter generally designated by reference numeral 51 which is connected behind an electromagnetic control valve generally designated by reference numeral 10 (FIG. 2).

Figure 2:
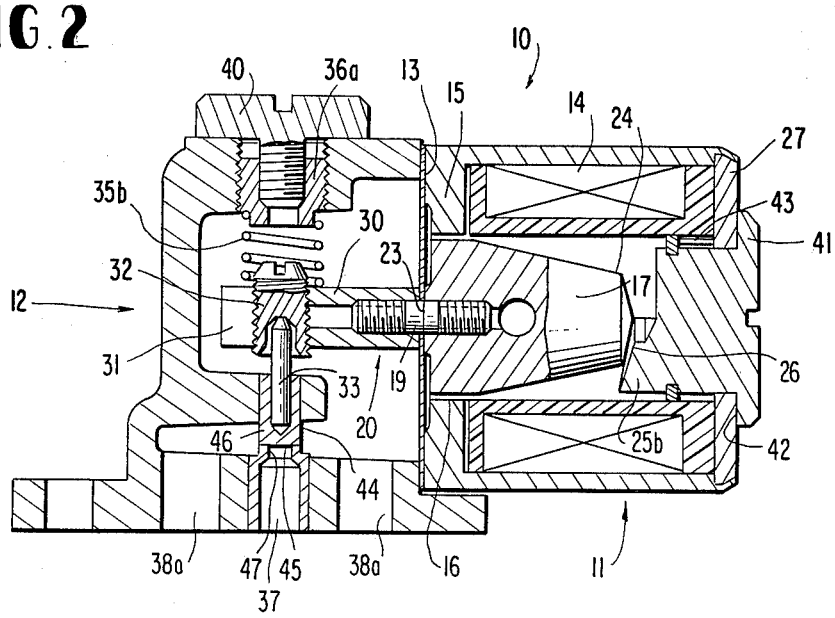
FIG. 2 is a cross-sectional view through the control valve of the brake installation according to the present invention of FIG. 1, shown also approximately to scale.
Figure 3:
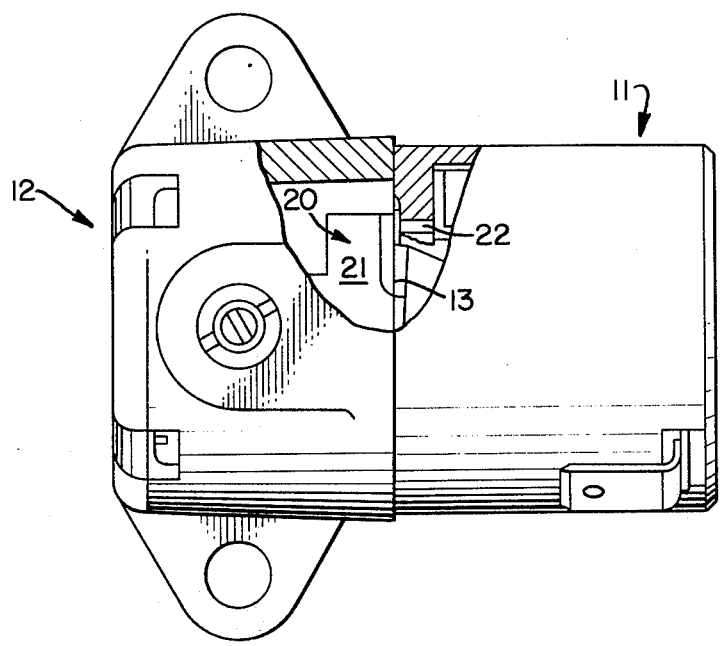
FIG. 3 is a partial cross-sectional plan view of the control valve of FIG. 2 rotated by 90°.

According to FIG. 2, the control valve 10 consists of a magnet part generally designated by reference numeral 11 and of a valve part generally designated by reference numeral 12. Both parts 11 and 12 are separated from one another in a pressure-medium-tight manner by a diaphragm 13 disposed therebetween. A pot-shaped electromagnet 14 is disposed in the magnet part 11, which includes a circular ring-shaped first pole shoe 15 directly adjacent the diaphragm 13. The pole shoe 15 forms a first ring-shaped magnetic gap 16 together with a conical pin 17 acting as an armature. A connecting pin 19 connects the armature 17 with a support arm generally designated by reference numeral 20 in the valve seat 12. The diaphragm 13 is centered on the connecting pin 19. The support arm 20 is constructed T-shaped, i.e., it includes a longitudinal beam 30 with two cross webs 21 (FIG. 3) which are disposed diametrically opposite to one another. These cross webs 21 form, together with two corresponding counter bearing pins 22 in the pole shoe 15, a knife-edge bearing support in such a manner that the pivot axis of the system formed at the armature 17 and the valve lie in the plane of the diaphragm 13. The center point of the mass of the system lies directly, or only with a very slight deviation, in the point of intersection of this pivot axis with the axis of symmetry so that therefore the entire system is suspended in the mass center, i.e., the center of gravity of the mass.

The end 24 of the armature 17 opposite the diaphragm 13 is constructed of spherical segmental shape. A second pole shoe 25b is disposed opposite thereto, and more particularly eccentrically to the symmetry axis, so that a second magnet gap 26 results. The pole shoe 25b is constructed plug-like and is provided externally with a flange 41. The inner surface 42 of this flange and the corresponding outer surface of the cover 27 serving for the rotatable support of the pole shoe 25b are provided with a fine serration. A spring 43 maintains these serrations or teeth continuously in engagement so that the pole shoe 25b is fixed in the once-adjusted position relative to the pivot axis.

A longitudinal beam 30 is slotted at the end and a support sleeve 32 is adjustably screwed into slot 31 as a threaded plug or stopper. The support sleeve 32 serves for the support of a valve pin 33 which is screwed into a cylinder sleeve 44 by operating as valve closure member and provided with a closed, flat bottom 45. The cylinder sleeve 44 is guided in a housing bore 46 so that it can be displaced only axially parallel with respect to the valve seat 47.

A valve spring 35b engaging at the longitudinal beam 30 is supported at the housing on an adjusting plug 36a. A closure plug 40 secures the adjustment of the adjusting plug 36a and simultaneously seals the housing in a pressure-medium-tight manner with respect to the outside.

A pressure-medium derived from the pressure source 8 (FIG. 1) by way of a throttle 52 (FIG. 1) flows to the valve 45, 47 by way of the valve connection 37 (FIGS. 1 and 2) and then again leaves pressureless through openings 38a (FIG. 2). The controlled pilot control pressure is detected or picked up in the modulating converter 51 between the throttle 52 and the valve connection 37.

If the electromagnet 14 is more or less energized, then the second pole shoe 25b exerts on the system formed by the armature 17 and support arm 20 a torque about the pivot axis 23 which acts in a direction opposite to the valve spring 35b and in the same direction as the pilot control pressure of the valve connection 37. In this manner, the pilot control pressure has a characteristic decreasing pressure with an increasing energization of the electromagnet 14.

One end of the adjusting slide valve member 50 (FIG. 2) is connected with a diaphragm 53 which separates from one another two pressure chambers 54 and 55 and is held in the illustrated normal or rest position by a spring 56. The pressure chamber 55 is connected by way of a housing channel 57 with the valve connection 37 of the control valve 10 as well as by way of a housing channel 58 containing the throttle 52 with the housing connection 59. The housing connection 59 is in communication with the pressure source 8 by way of a pressure feed line 60 (FIG. 1).

The housing channel 58 is in communication by way of a by-pass channel 61 by-passing the throttle 52 with an annular channel 62 (FIG. 1) which is connected with the pressure chamber 54 by way of a filling channel 64 containing a throttle 63 as also by way of a by-pass channel 65 connected in parallel to the filling channel 64. The by-pass channel 65 is adapted to be closed off with respect to the pressure chamber 54 by a closure piston 67 operating against a spring 66, whereby the closure piston 67 is continuously acted upon by the pressure of the pressure chamber 54 on its end face opposite the spring 66. The throttle 63 is so matched to the springs 56 and 66 that during the simultaneous filling of the pressure chamber 54 and 55 by way of the housing channels 58 and 61, the diaphragm 53 cannot be deflected out of its rest position against the effect of the spring 56. This would be possible, as such, by reason of the differential action of the adjusting slide valve member 50 in the pressure chamber 55 and would lead to an undesired control of a brake control pressure in the brake control line 7. When the pressure in the pressure chamber 55 has been brought to its value required for the force equilibrium at the diaphragm 53, the closure piston 67 opens up the by-pass channel 65 so that the throttle 63 is effectively turned off or disconnected.

A hollow slide valve member 73 is displaceably guided in a housing bore generally designated by reference numeral 68 of the servo-device 9 which includes three enlarged sections for the formation of one valve chamber 69 to 71 each and which is closed off at one end by the adjusting slide valve member 50 and at the other end by a threaded closure member 72. The central opening 74 of the hollow slide valve member which extends through the center valve chamber 70 with clearance, connects in the illustrated rest position of the hollow slide valve member 73, the two outer valve chambers 69 and 71 with each other. A plate-like or dish-like valve closure member 76 fixed as to its movement with respect to the adjusting slide valve member 50 is diplaceably arranged in the valve chamber 69 which is in continuous communication with a pressure-relieved zero-connection 75; the valve closure member 76 cooperates with an end 77 of the hollow slide valve member 73 which is constructed as valve seat member and projects into the valve chamber 69. The parts 76 and 77 form the outlet valve of servo device 9 interconnected between the zero-connection 75 and the brake control pressure line 7. When the parts 76 and 77 are in mutual abutment and thus the outlet valve is closed, the pressure surface 78 of the valve closure member 76, which is disposed adjacent the hollow slide valve member 73 and is acted upon by the brake control pressure, exerts a feedback on the adjusting slide valve member 50 for purposes of achieving a feedback effect.

The valve chamber 70 which is in open communication with the housing connection 59 for the pressure source 8, is closed off with respect to the valve chamber 71, which is connected by way of a housing connection 79 with the brake control pressure line 7, by means of an annularly shaped inlet valve 80, 81 through which extends the hollow slide valve member 73; the valve closure ring 80 of the inlet valve 80, 81 is held in abutment at the valve seat ring 81 by way of a closing spring 82 supported at the threaded closure member 72. The inlet valve 80, 81 is opened by corresponding cam edges 83 and 84 at the hollow slide valve member 73 and at the valve closure ring 80. In the closing direction, the hollow slide valve member 73 cooperates for damping reasons with the valve closure ring 80 by way of a damping spring 85.

The valve seat diameter of the inlet and outlet valve 80, 81 and 76, 77 are equal to the internal diameter of the housing bore 68 so that no reaction pressure forces occur at the hollow slide valve member 73. The operation of the brake system is as follows:

Feed pressure of the pressure source 8=0:

The valve closure member 76 of the outlet valve 76, 77 is kept in the illustrated normal rest position by the spring 56 by way of the adjusting slide valve member 50 and the inlet valve 80, 81 is kept in the illustrated normal rest position by the closure spring 82. As a result thereof, the valve closure member 76 is lifted off from the valve seat 77 at the hollow slide valve member 73 and the brake control pressure line 7 is connected with the zero-connection 75. The adjusting member 3 of the brake relay valve is thus actuatable exclusively by the brake pedal 5 without any influencing by the adjusting motor 6.

Starting of the pressure source 8 for the feed pressure:

The pressure chamber 55 for the pilot control pressure is slowly filled under the effect of the throttle 52 by way of the housing channel 58.

With an open connection of the pressure chamber 54 for the comparison pressure with the housing channel 58, the pressure in this chamber 54 would rise more strongly than the pressure in the pressure chamber 55, as a result of which the adjusting slide valve member 50 would actuate the hollow slide valve member 73 and therewith would close the outlet valve 76, 77 and would open the inlet valve 80, 81; this would have as a consequence an unintentional brake actuation by the adjusting motor 6.

In order to avoid this unintentional brake actuation, a parallel arrangement of a throttle 63 and of a closure piston 67 is interconnected in the filling connection 61, 62 to the pressure chamber 54. The closure piston 67 closes a by-pass channel 65 to the pressure chamber 54 so that a pressure can build up only slowly in the pressure chamber 54 by way of the filling channel 64 as a result of the throttle 63. With an increasing pressure in the pressure chamber 54, the closure piston 67 is displaced into its opening position under compression of its spring 66 when the full feed pressure is built up in the pressure chamber 54. In this open position, the by-pass channel 65 is in free communication with the pressure chamber 54 so that also with rapid movements of the diaphragm 53, a constant comparison pressure is available at the diaphragm.

Electrically controlled brake control pressure:

If the electromagnet is not energized, then the housing channel 57 (FIG. 1) of the pressure chamber 55 is kept closed by the valve 45, 47 (FIG. 2) under the influence of the valve spring 35$b$ so that the feed pressure is being built up in both pressure chambers 54 and 55 and the spring 56 keeps the valve closure member 76 in its open position by way of the adjusting slide valve member 50, and the brake control pressure line 7 is rendered pressureless by way of the zero-connection 75.

If the electromagnet 14 is energized, then the armature 17 exerts a magnetic pivoting force on the support arm 20 against the valve spring 35$b$ in the same direction as a pressure force at the valve bottom 45. By reason of the force equilibrium $$p_{0/35} + c_{35} \cdot x_{35} = p_v \cdot F_{47} + P_M,$$

wherein:
 $p_{0/35}$ = prestress force of the valve spring 35$b$,
 $c_{35}$ = spring contrast of the valve spring 35$b$,
 $x_{35}$ = spring path of the valve spring 35$b$,
 $p_v$ = pilot control pressure of the pressure chamber 55,
 $F_{47}$ = interior cross section of the valve seat 47,
 $P_M$ = magnet force effect on the support arm 20,
the valve 45, 47 opens so far that the pressure $p_v$ decreases inversely proportional to the magnetic force. The differential pressure between the comparison pressure $p_{54}$ in the pressure chamber 54 and the pilot control pressure $p_v$ in the pressure chamber 55 now acts on the diaphragm 53 so that the adjusting slide valve member 50 closes the outlet valve 76, 77. If the differential pressure force $$\Delta P = p_{54} \cdot F_{54} - (p_v \cdot F_{55} + p_{0/56} + c_{56} \cdot x_{56}),$$

wherein
 $p_{54}$ = comparison pressure in the pressure chamber 54,
 $F_{54}$ = pressure surface of the diaphragm 53 in the pressure chamber 54,
 $F_{55}$ = pressure area of the diaphragm 53 in the pressure chamber 55,
 $p_{0/56}$ = prestress force of the spring 56,
 $c_{56}$ = spring constant of the spring 56,
 $x_{56}$ = spring path of the spring 56,
becomes larger than the prestress force $P_{0/82}$ of the closure spring 82, then the hollow slide valve member 73 opens the inlet valve 80, 81.

Pressure medium now flows into the brake control pressure line 7 and therewith into the adjusting motor 6 for such length of time until the pressure in the valve chamber 71 and therewith the brake control pressure $p_{Br}$ is so large that the force equilibrium will establish itself at the hollow slide valve member 73

$$p_{0/82} + c_{82} \cdot x_{82} + p_{Br} \cdot F_{86} = p_{54} \cdot F_{54} - (p_v \cdot F_{55} + p_{0/56} + c_{56} \cdot x_{56})$$

wherein
 $c_{82}$ = spring constant of the closure spring 82,
 $x_{82}$ = spring path of the closure spring 82,
 $F_{86}$ = circular cross section with the diameter 86.

At that time, also the inlet valve 80, 81 will close so that the brake control pressure line 7 is closed off from the pressure source 8. Thus, the brake control pressure $p_{Br}$ changes nearly proportionally to the electrical energization of the magnet 14.

If the energization of the magnet 14 is reduced, then the effect of the spring 35b on the valve 45, 47 again becomes stronger and the pilot control pressure in the pressure chamber 55 rises again by way of the throttle 52 for such length of time until a force equilibrium will again establish itself at the valve 45, 47

$$P_M + P_v \cdot F_{47} + P_{0/35} + c_{35} \cdot x_{35}.$$

As a result of the larger pilot control pressure $p_v$, the difference force $$\Delta P = p_{54} \cdot F_{54} - (p_v \cdot F_{55} + P_{0/56} + c_{56} \cdot x_{56})$$

becomes smaller than the feedback effect $$P_R = p_{Br} \cdot F_{78}$$

wherein $F_{78}$ represents the effective cross section of the pressure surface 78.

The outlet valve 76, 77 now opens for such length of time until the brake control pressure $p_{Br}$ is so small that the force equilibrium at the hollow slide valve member 73

$$p_{54} \cdot F_{54} = p_v \cdot F_{55} + P_{0/56} + c_{56} \cdot x_{56} + p_{Br} \cdot F_{78}$$

is again re-established.

With an additional actuation of the brake pedal 5 by the driver, the selective actuating force of the driver is added to the actuating force of the adjusting motor 6 so that a stronger braking occurs.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A pressure medium brake installation for vehicles, which comprises an electromagnetic control valve means for producing a brake control pressure that increases with an increase of the energizing magnitude of the electromagnetic control valve means, characterized in that the control valve means is operable to produce a pilot control pressure decreasing with an increase of the energizing current of the electromagnetic control valve means, and modulating converter means operable to supply an adjusting force dependent essentially on the difference between the pilot control pressure and an essentially constant comparison pressure and increasing with an increase of the energizing current, said modulating converter means including adjusting means being operable to adjust the brake control pressure.

2. A brake installation according to claim 1, characterized in that said adjusting means includes an adjusting slide valve member operable to adjust the brake control pressure.

3. A brake installation according to claim 1, characterized in that said control valve means includes a magnet part and a valve part separated from one another in a pressure medium-tight manner by a diaphragm means disposed therewithin.

4. A brake installation according to claim 3, characterized in that said magnetic part includes an essentially pot-shaped electromagnet which includes a first pole shoe means adjacent the diaphragm means.

5. A brake installation according to claim 4, characterized in that said first pole shoe means is of circular ring shape and is arranged directly adjacent the diaphragm means, said first pole shoe means forming together with an armature means of the electromagnet part of first substantially ring-shaped magnetic gap.

6. A brake installation according to claim 5, characterized in that said armature means is in the form of a conical pin member which is connected by way of a connecting pin with a support arm means in the valve part.

7. A brake installation according to claim 6, characterized in that the diaphragm means is centered on said connecting pin.

8. A brake installation according to claim 6, characterized in that said valve part includes a closure valve means, and in that said support arm means is essentially T-shaped and includes an essentially longitudinal beam member with two diametrically arranged cross webs forming together with abutment pins in the first pole shoe means a knife edge bearing in such a manner that the pivot axis of the system formed by the armature means and the closure valve means is located at least approximately in the plane of the diaphragm.

9. A brake installation according to claim 8, characterized in that the mass center of the system consisting of armature means and closure valve means is located at most only slightly displaced from the point of intersection of the pivot axis with the symmetry axis of the system.

10. A brake installation according to claim 8, characterized in that the end of the armature means opposite the diaphragm means is constructed essentially spherically segmentally shaped.

11. A brake installation according to claim 8, characterized in that a second pole shoe means is provided in the magnet part facing the end of the armature means opposite the diaphragm means, said second pole shoes means being arranged eccentrically to the symmetry axis of the system so that a second magnet gap results.

12. A brake installation according to claim 11, characterized in that the second pole shoe means is constructed plug-like and is operable to be selectively rotated.

13. A brake installation according to claim 11, characterized in that the longitudinal beam is slotted at the end near the valve closure means, and threaded means screwed into the slot of the longitudinal beam and operable as valve closure member for and cooperating with a valve seat of the valve closure means.

14. A brake installation according to claim 13, characterized by adjustable means for adjusting the prestress with which the valve closure member is held at the corresponding valve seat.

15. A brake installation according to claim 2, characterized in that the adjusting means of the modulating converter means is operable with feedback of the brake control pressure.

16. A brake installation according to claim 15, characterized in that the feedback is obtained by a pressure area on the adjusting slide valve member of said adjusting means.

17. A brake installation according to claim 1, characterized in that a pressure chamber of the modulating converter means which is adapted to be placed under the pilot control pressure and a pressure chamber of the modulating converter means which is adapted to be placed under a comparison pressure, are connected with each other by a pressure-medium filling connection means containing a throttle means effectively shut-off automatically in dependence on the pressure.

18. A brake installation according to claim 17, characterized in that the pressure chamber adapted to be placed under pilot control pressure and the pressure chamber of the modulating converter means adapted to be placed under comparison pressure, are separated from one another by a piston diaphragm means connected with the adjusting means.

19. A brake installation according to claim 18, characterized in that the modulating converter means controls a servo means interconnected between a brake control pressure line and a pressure source.

20. A brake installation according to claim 19, characterized in that the servo means includes a hollow slide valve means in communication with its central opening with the brake control pressure line, whose one slide valve member end is adapted to be brought into abutment at a pressure surface cooperating with the adjusting means of the modulating converter means.

21. A brake installation according to claim 20, characterized in that the servo means includes a common adjusting means in the form of the last-mentioned hollow slide valve means actuating an inlet valve means interconnected between the pressure source and the brake control pressure line as well as an outlet valve means interconnected between a pressure-relieved zero-connection and the brake control pressure line.

22. A brake installation according to claim 21, characterized in that the servo means includes a valve chamber means in communication with the zero-connection, in which a valve closure member of the outlet valve means, which is provided with the pressure surface cooperating with the slide valve member end projecting into said valve chamber means, is movably guided in the directions of the slide valve member axis.

23. A brake installation according to claim 22, characterized in that the last-mentioned hollow slide valve means extends through a valve chamber means of the servo means which is in communication with a connection for the pressure source, said last-mentioned valve chamber means being closed with respect to another valve chamber means in communication with a connection for the brake control pressure line, by the inlet valve means, the other slide valve member end being located in said another valve chamber means.

24. A brake installation according to claim 23, characterized in that said inlet valve means is ring-shaped, and in that the last mentioned hollow slide valve means actuates the ring-shaped closure member of the inlet valve means.

25. A brake installation according to claim 23, characterized in that the pressure surfaces at the hollow slide valve means which are influenced by the respective pressure in the valve chamber means are so matched mutually in their size that no retroactive pressure forces occur at the hollow slide valve means in the directions of the slide valve axis.

26. A brake installation according to claim 25, characterized in that the valve chamber means of the servo means which is in communication with the connection for the pressure source, and the pressure chamber of the modulating converter means which is adapted to be placed under the pilot control pressure, are connected with each other by a pressure medium connection containing a throttle means.

27. A brake installation according to claim 26, characterized in that an adjusting motor means operating with the brake control pressure and a brake pedal actuatable at will are connected with each other by way of differential actuating means.

28. A brake installation according to claim 27, characterized in that the differential actuating means includes a multi-circuit brake valve.

29. A brake installation according to claim 28, characterized in that said control valve means includes a magnet part and a valve part separated from one another in a pressure medium-tight manner by a diaphragm means disposed therewithin.

30. A brake installation according to claim 29, characterized in that said magnetic part includes an essentially pot-shaped electromagnet which includes a first pole shoe means adjacent the diaphragm means.

31. A brake installation according to claim 30, characterized in that said first pole shoe means is of circular ring shape and is arranged directly adjacent the diaphragm means, said first pole shoe means forming together with an armature means of the electromagnet part a first substantially ring-shaped magnetic gap.

32. A brake installation with an armature means according to claim 29, characterized in that said armature means is in the form of a conical pin member which is connected by way of a connecting pin with a support arm means in the valve part.

33. A brake installation according to claim 32, characterized in that said valve part includes a closure valve means, and in that said support arm means is essentially T-shaped and includes an essentially longitudinal beam member with two diametrally arranged cross webs forming together with abutment pins in a first pole shoe means a knife edge bearing in such a manner that the pivot axis of the system formed by the armature means and the closure valve means is located at least approximately in the plane of the diaphragm.

34. A brake installation with an armature means in the magnet part according to claim 30, characterized in that the end of the armature means opposite the diaphragm means is constructed essentially spherically segmentally shaped.

35. A brake installation according to claim 34, characterized in that a second pole shoe means is provided in the magnet part facing the end of the armature means opposite the diaphragm means, said second pole shoe means being arranged eccentrically to the symmetry axis of the system so that a second magnet gap results.

36. A brake installation according to claim 17, characterized in that the adjusting means of the modulating converter means is operable with feedback of the brake control pressure.

37. A brake installation according to claim 1, characterized in that a pressure chamber adapted to be placed under pilot control pressure and a pressure chamber of the modulating converter means adapted to be placed under comparison pressure, are separated from one another by a piston diaphragm means connected with the adjusting means.

38. A brake installation according to claim 1, characterized in that the modulating converter means controls a servo means interconnected between a brake control pressure line and a pressure source.

39. A brake installation according to claim 38, characterized in that the servo means includes a hollow slide valve means in communication with its central opening with the brake control pressure line, whose one slide valve member end is adapted to be brought into abutment at a pressure surface cooperating with the adjusting means of the modulating converter means.

40. A brake installation according to claim 38, characterized in that a servo means includes a common adjusting means in the form of a hollow slide valve means for actuating an inlet valve means interconnected between the pressure source and the brake control pressure line as well as an outlet valve means interconnected between a pressure-relieved zero-connection and the brake control pressure line.

41. A brake installation according to claim 40, characterized in that the servo means includes a valve chamber means in communication with the zero-connection, in which closure member of the outlet valve means, which is provided with the pressure surface cooperating with the slide valve member end projecting into said valve chamber means, is movably guided in the directions of the slide valve member axis.

42. A brake installation according to claim 38, characterized in that a hollow slide valve means extends through a valve chamber means of the servo means which is in communications with a connection for the pressure source, said last-mentioned valve chamber means being closed with respect to another valve chamber means in communication with a connection for the brake control pressure line, by an inlet valve means, the other slide valve member end being located in said another valve chamber means.

43. A brake installation according to claim 1, characterized in that an adjusting motor means operating with a brake control pressure and a brake pedal actuatable at will are connected with each other by way of a differential actuating means.

44. A brake installation according to claim 43, characterized in that the differential actuating means includes a multi-circuit brake valve.

* * * * *